(12) United States Patent
Cheng et al.

(10) Patent No.: US 8,484,480 B2
(45) Date of Patent: Jul. 9, 2013

(54) TRANSMITTING INFORMATION USING VIRTUAL INPUT LAYOUT

(75) Inventors: Li Cheng, Hangzhou (CN); Lei Li, Hangzhou (CN)

(73) Assignee: Alibaby Group Holding Limited, Grand Cayman (KY)

( * ) Notice: Subject to any disclaimer, the term of this patent is extended or adjusted under 35 U.S.C. 154(b) by 121 days.

(21) Appl. No.: 12/663,247

(22) PCT Filed: Jul. 7, 2009

(86) PCT No.: PCT/US2009/049796
§ 371 (c)(1),
(2), (4) Date: Dec. 4, 2009

(87) PCT Pub. No.: WO2010/005960
PCT Pub. Date: Jan. 14, 2010

(65) Prior Publication Data
US 2011/0191591 A1      Aug. 4, 2011

(30) Foreign Application Priority Data
Jul. 8, 2008   (CN) .......................... 2008 1 0133098

(51) Int. Cl.
*G06F 21/00*   (2006.01)
(52) U.S. Cl.
USPC ........................................................ 713/182
(58) Field of Classification Search
USPC ........................................................ 713/182
See application file for complete search history.

(56) References Cited

U.S. PATENT DOCUMENTS

| 4,333,090 A | 6/1982 | Hirsch |
| 5,949,348 A | 9/1999 | Kapp et al. |
| 6,108,583 A | 8/2000 | Schneck et al. |
| 6,209,102 B1 | 3/2001 | Hoover |
| 6,332,192 B1 | 12/2001 | Boroditsky et al. |

(Continued)

FOREIGN PATENT DOCUMENTS

| CN | 1825796 A | 8/2006 |
| WO | WO02071177 | 9/2002 |

OTHER PUBLICATIONS

The European Search Report mailed Nov. 7, 2011 for European patent application No. 09795059.6, 6 pages.

(Continued)

*Primary Examiner* — Cordelia Zecher
(74) *Attorney, Agent, or Firm* — Lee & Hayes, PLLC

(57) ABSTRACT

Method and apparatus for information transmission are provided. A method for information transmission uses a virtual input layout to encrypt security information. The method uses a server to receive an access request from a user client and to generate a virtual input layout based on information of an actual input layout of the user client. Each key in the virtual input layout has a corresponding relationship with a respective key in the actual input layout, and at least some of the keys in the virtual input layout represent symbols or functions that are different from their corresponding keys in the actual input layout. The server sends the virtual input layout to the user client to be displayed, and subsequently receives from the user client a virtual security information entered by the user according to the virtual input layout displayed. The server then converts the virtual security information to obtain true security information.

20 Claims, 4 Drawing Sheets

U.S. PATENT DOCUMENTS

| | | | |
|---|---|---|---|
| 6,434,702 B1 | 8/2002 | Maddalozzo, Jr. et al. | |
| 6,549,194 B1 | 4/2003 | McIntyre et al. | |
| 6,725,252 B1 | 4/2004 | Himmel et al. | |
| 7,103,772 B2 | 9/2006 | Jorgensen et al. | |
| 7,992,007 B2 * | 8/2011 | Lazzaro et al. | 713/183 |
| 2002/0016918 A1 | 2/2002 | Tucker et al. | |
| 2002/0184526 A1 | 12/2002 | Bender et al. | |
| 2004/0006709 A1 * | 1/2004 | Chen | 713/201 |
| 2005/0256811 A1 | 11/2005 | Pagel et al. | |
| 2006/0282660 A1 * | 12/2006 | Varghese et al. | 713/155 |
| 2007/0195071 A1 | 8/2007 | Chen et al. | |
| 2008/0172735 A1 | 7/2008 | Gao et al. | |
| 2008/0258940 A1 | 10/2008 | Ding et al. | |

OTHER PUBLICATIONS

The Chinese Office Action mailed Nov. 10, 2010, a foreign counterpart application of U.S. Appl. No. 12/663,247, 8 pages.

The Chinese Office Action mailed Feb. 24, 2011, a foreign counterpart application of U.S. Appl. No. 12/663,247, 10 pages.

The European Office Action mailed Nov. 12, 2012 for European patent application No. 09795059.6, a counterpart foreign application of U.S. Appl. No. 12/663,247, 6 pages.

The Chinese Office Action mailed Nov. 10, 2010, a foreign counterpart application of U.S. Appl. No. 12/663,247, 16 pages.

The Chinese Office Action mailed Feb. 24, 2011, a foreign counterpart application of U.S. Appl. No. 12/663,247, 20 pages.

* cited by examiner

Fig. 2

TRANSMITTING INFORMATION USING VIRTUAL INPUT LAYOUT

RELATED APPLICATIONS

This application is a national stage application of international patent application PCT/US09/49796 filed Jul. 7, 2009, entitled "TRANSMITTING INFORMATION USING VIRTUAL INPUT LAYOUT" which claims priority from Chinese patent application, Application No. 200810133098.2, filed Jul. 8, 2008, entitled "METHOD, SYSTEM AND APPARATUS FOR INFORMATION TRANSMISSION", which applications are hereby incorporated in their entirety by reference.

TECHNICAL FIELD

The present disclosure relates to communication technologies, and particularly relates to methods and systems for information transmission.

BACKGROUND

In an e-commerce application having a high security requirement, two types of methods are generally used to ensure that a password entered by a user is not acquired by another person. One is to use a SSL (i.e., Security Socket Layer) encryption channel, and another is to install encryption control in a user client.

SSL is a security protocol that constructs a secure channel between a browser and a web server for conducting data transmission. Operating on top of a TCP/IP layer but beneath an application layer, SSL provides a data encryption channel for an application program. By employing encryption algorithms such as RC4, MD5, and RSA, and using 40-bit encryption key, SSL is made suitable for encryption of business information.

However, if a user client is a mobile device such as a mobile phone, certain limitations exist in the above two methods. For example, various types of smart operating systems exist in existing mobile phones. Whether it is an SSL encryption channel or an encryption control that is installed, it needs to be designed according to different operating systems of the mobile phones, unavoidably resulting in increased cost. Moreover, many existing non-smart mobile phones do not have the capabilities to support operations of an SSL encryption channel or a security control. Therefore, many mobile handheld devices either fail to implement common encryption algorithms, or fail to install security control on browsers.

For foregoing reasons, existing technologies that transmit information using mobile phones that cannot install proper security controls or cannot implement encryption algorithms have poor security. As a result, e-commerce applications that involve transmitting security information such as user password may find that the security requirement is not satisfied when using mobile devices. This hinders e-commerce applications in fields of mobile handheld devices such as mobile phones.

SUMMARY

The present disclosure provides a method and system for information transmission in order to improve the security of the existing technologies.

One aspect of the disclosure is a method for information transmission that uses a virtual input layout to obscure security information. The method uses a server to receive an access request from a user client and to generate a virtual input layout based on information of an actual input layout of the user client. Each key in the virtual input layout has a corresponding relationship with a respective key in the actual input layout, and at least some of the keys in the virtual input layout represent symbols or functions that are different from their corresponding keys in the actual input layout. The server sends the virtual input layout to the user client to be displayed, and subsequently receives from the user client a virtual security information entered by the user according to the virtual input layout displayed. The server then converts the virtual security information based on the corresponding relationships of the keys to obtain the true security information. One example of true security information is a security code such as a user password. One example of the user client is a mobile phone.

The server may also receive user client information from the user client and finds the actual input layout of the user client using the user client information. The user client information may be a model number of the user client.

In one embodiment, the server generates an identifier of the virtual input layout, and sends the identifier of the virtual input layout as a hidden field in a form of a web page displayed on the user client. The server receives the identifier of the virtual input layout along with the virtual security information from the user client, and finds the corresponding relationships between the keys in the virtual input layout and the keys in the actual input layout based on the identifier.

The virtual security information may be entered using an actual keyboard of the user client according to the virtual input layout. The virtual security information may also be entered using a virtual input device having the virtual input layout if the display screen is a touch screen.

Another aspect of the disclosure is a server that includes a virtual input layout generation unit, a virtual input layout output unit, and an input information conversion unit. The virtual input layout generation unit is used for generating a virtual input layout based on the information of an actual input layout of a user client upon receiving an access request from the user client. Each key in the virtual input layout has a corresponding relationship with a respective key in the actual input layout, and at least some of the keys in the virtual input layout represent symbols or functions that are different from their corresponding keys in the actual input layout.

The virtual input layout output unit is used for sending the virtual input layout to the user client to be displayed. The input information conversion unit is used for receiving obscured security information entered through the user client according to the virtual input layout displayed on the user client, and converting the received obscured security information based on the corresponding relationships between the keys in the virtual input layout and the keys in the actual input layout to obtain true security information.

The server may also include a database for storing the information of the actual input layout of the user client, such as symbols and functions represented by the keys in the actual input layout of the user client. The database may be further used for storing a model number of the user client. In this case, the server may use a database search unit to search within the database for the information of the actual input layout that corresponds to the presently received model number of the user client, and for sending the found information of the actual input layout to the virtual input layout generation unit.

In one embodiment, the server has a virtual input layout search unit used for finding the virtual input layout that corresponds to an identifier of the virtual input layout submitted by the user client. The identifier of the virtual input layout is generated by the virtual input layout generation unit of the server and sent to the user client.

The disclosed method and system prevent security information from being transmitted in a plaintext over a network. This is especially helpful under circumstances where a user client cannot install a security encryption control.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF DRAWINGS

The detailed description is described with reference to the accompanying figures. In the figures, the left-most digit(s) of a reference number identifies the figure in which the reference number first appears. The use of the same reference numbers in different figures indicates similar or identical items.

FIG. 2 shows a schematic diagram illustrating an exemplary actual keyboard layout and an exemplary virtual keyboard layout in accordance with the present disclosure.

DETAILED DESCRIPTION

The exemplary embodiments of the present disclosure provide a method, a system and an apparatus for information transmission in order to improve the security of information transmission using a user client.

User clients described in the exemplary embodiments of the present disclosure generally refer to user clients that have weak security capabilities. Examples of such user clients include ordinary mobile phones which are unable to install security control, and/or unable to implement an encryption algorithm.

The exemplary embodiments of the present disclosure illustrate a technical scheme using a mobile phone as an example. The mobile phone's keyboard is used as an input device as described in the exemplary embodiments of the present disclosure. Evidently, any user clients similar to the mobile phone may also adopt the technical scheme provided in the exemplary embodiments of the present disclosure.

In the present disclosure, information such as an account password of a user that needs to be kept secret and requires a relatively high security level is referred to as security information and, in some exemplary instances, as a security code.

The exemplary embodiments of the present disclosure are described in details below using accompanying figures.

Figure 1:
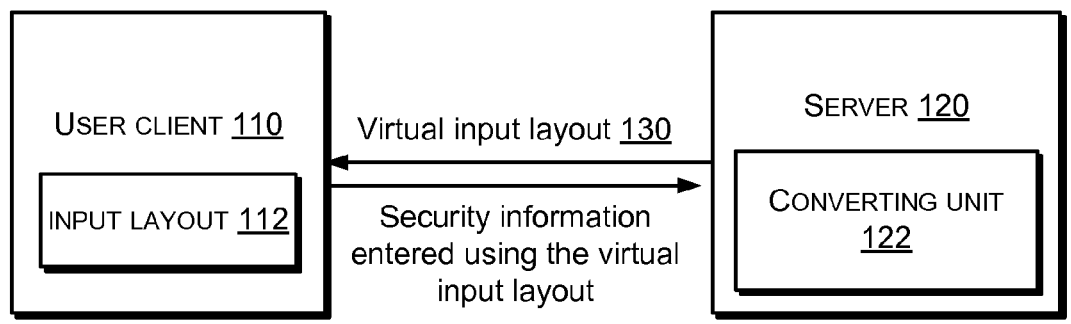
FIG. 1 shows a schematic diagram of an exemplary system for information transmission in accordance with the present disclosure.

FIG. 1 shows a schematic diagram of an exemplary system 100 for information transmission in accordance with the present disclosure. The system 100 includes a user client 110 and a server 120. It is noted that the user client 110 may represent one or more different user clients communicating with the user 120. The user client 110 is used for receiving and displaying a virtual input layout 130 sent from the server 120 to a user using the user client 110 to access the server 120. The user client 110 is also used for sending to the server 120 security information that is entered by the user according to the virtual input layout 130 received from the server 120. Such security information, being entered using the virtual input layout 130, is referred to as virtual security information in this disclosure, or as obscured security information due to its obscured nature as described herein.

As will be described further below, the virtual input layout 130 has keys which have a corresponding relationship between the keys in the actual input layout 112 of the user client 110. Such corresponding relationship may be based on positions of the keys. For example, a key on the virtual input layout 130 corresponds to a key at the same layout position on the actual input layout. At least some of the keys in the virtual input layout 130 represent symbols or functions that are different from the symbols or functions represented by their corresponding keys in the actual input layout 110.

The server 120 is used for generating the virtual input layout 130 based on the actual input layout 112 of the user client 110 when the server 120 is accessed by the user client 110, and for sending the virtual input layout 130 to the user client 110 to be displayed to the user. The user enters virtual (obscured) security information using the virtual display layout 130 and sends the lecture security information from the user client 110 to the server 120. The server 120 has a converting unit 122 used for converting the received virtual security information into true security information based on the corresponding relationship between the keys in the virtual input layout 130 and the keys in the actual input layout 112.

In one embodiment, the server 120 receives user client information from the user client 110 when the user accesses the server 120 through the user client 110. Using the user client information, the server 120 finds information of the actual input layout 112 of the user client 110. The user client information may be a model number of the user client. The information of the actual input layout 112 may include symbols represented by the keys in various positions on the actual input layout 112.

Preferably, while generating the virtual input layout 130, the server 120 further assigns a unique identifier to the virtual input layout 130. The server 120 outputs the virtual input layout 130 to a web page which is displayed on the user client 110, and outputs the identifier of the virtual input layout 130 to a form of the web page. The identifier may be placed in a hidden field of the form. At the time when the virtual security information entered using the virtual input layout 130 is received from the user client 10, the server 120 also receives the identifier of the virtual input layout 130. Based on the identifier, the server 120 finds the corresponding relationship between the keys of the virtual input layout 130 and keys of the actual input layout 112.

It should be noted that the virtual input layout 130 generated by the server 120 each time when an access request is received from the user client 110 may be different from time to time. The virtual input layout 130 may also change from one user client 110 to another user client 110. Alternatively, the virtual input layout 130 may be updated periodically. That is, after receiving a certain number of access requests from the user client 110 (or any user client 110), the generated virtual input layout 130 is updated to a different one.

A more detailed description is provided below using a mobile phone as an example.

After a user has entered into a web page for requesting login through a browser of a mobile phone (e.g., user client 110), and successfully logged in, the mobile phone's model number is transmitted to a server (e.g., server 120). The server has stored therein hardware information of most mobile phones on the market and their respective mobile phone model numbers. Hardware information of a mobile phone includes symbols or functions represented by keys in the various key positions on the mobile phone's keyboard layout. The server searches for layout information of the keyboard of the mobile phone that corresponds to the presently received mobile phone model number. Based on the information of the mobile phone keyboard (the actual input layout 112), the server randomly alters positions of the keys in the actual keyboard layout to generate a virtual keyboard layout (virtual input layout 130) that is different from the actual keyboard layout. The server saves the corresponding relationships between the keys in the virtual keyboard layout and the keys on the actual keyboard layout, and assigns a unique identifier to the virtual keyboard layout to facilitate subsequent search for this virtual keyboard layout. The generated virtual keyboard layout is sent to the mobile phone to be displayed to the user. The virtual keyboard layout may be displayed on a web page the user has logged in through the mobile phone. At the same time, the identifier of the virtual keyboard layout is sent to a form of the web page display on the mobile phone. For example, a hidden field (i.e., a field that is not displayed on the web page, and hence is not seen by the user) may be added to the form of the web page logged in by the user, and used for storing the identifier of the virtual keyboard layout. When the user subsequently submits information that is entered using the virtual keyboard layout, the identifier of the virtual keyboard layout is also submitted at the same time.

The virtual keyboard layout may be generated using any suitable method. An exemplary method of generating a virtual keyboard layout is to treat each key on an actual keyboard as a space, and randomly filling a virtual key on each space. At least some virtual keys, however, have keyboard positions (visual locations in relation to other keys) different from those of actual keys representing the same symbols. In other words, at least some virtual keys represent symbols or functions that are different from the symbols represented by the corresponding actual keys on the same keyboard positions. Preferably, a newly assigned by virtual key should have not been previously assigned already for the same virtual keyboard layout.

Upon receiving the virtual keyboard layout, the user enters a security code with reference to the virtual keyboard layout. In one embodiment, the user refers to the virtual keyboard layout and enters the security code on the actual keyboard of the mobile phone using keys as if they were assigned values (symbols) according to the key positions on the virtual keyboard layout which is displayed on the mobile phone. Upon entering the security code, the user clicks the appropriate key for submission. What is being submitted is different from the actual security code. It is a virtual security code translated (obscured) from the actual security code according to the virtual keyboard layout, which is identified by the identifier of the virtual keyboard layout.

Using the identifier of the virtual keyboard layout, the server obtains the virtual keyboard layout stored therein that corresponds to the identifier. Based on the corresponding relationships between the keys in the virtual keyboard layout and the keys in the actual keyboard layout, the server converts the obscured virtual security code entered by the user into the true security code corresponding to the actual keyboard. This way, the true security code resulted from the conversion is the same security code that would have been entered by the user using the actual input keyboard had there been no virtual keyboard. The virtual security code that is being transmitted from the mobile phone to the server does not match the true security code and would be useless even if it is intercepted by an intruder. In this sense, the virtual security code is an obscured or "encrypted" security code. Upon completing the conversion, the server conducts subsequent tasks such as verifying the true security code.

Alternatively, if the user client has a touch screen, a virtual input device with the virtual input layout may be displayed on the user client and used as an active input means for the user to enter the security code directly by touching the keys on the virtual input device. In this scenario, the user would be pressing the keys on the virtual input device to enter the real security code, but the symbols or values of the keys that are transmitted over the network would not be the real security code but a virtual security code that is obscured from the real security code based on the corresponding relationship between the virtual input layout and the actual input layout. The virtual security code thus transmitted is then converted back to the real security code by the server.

Figure 2:
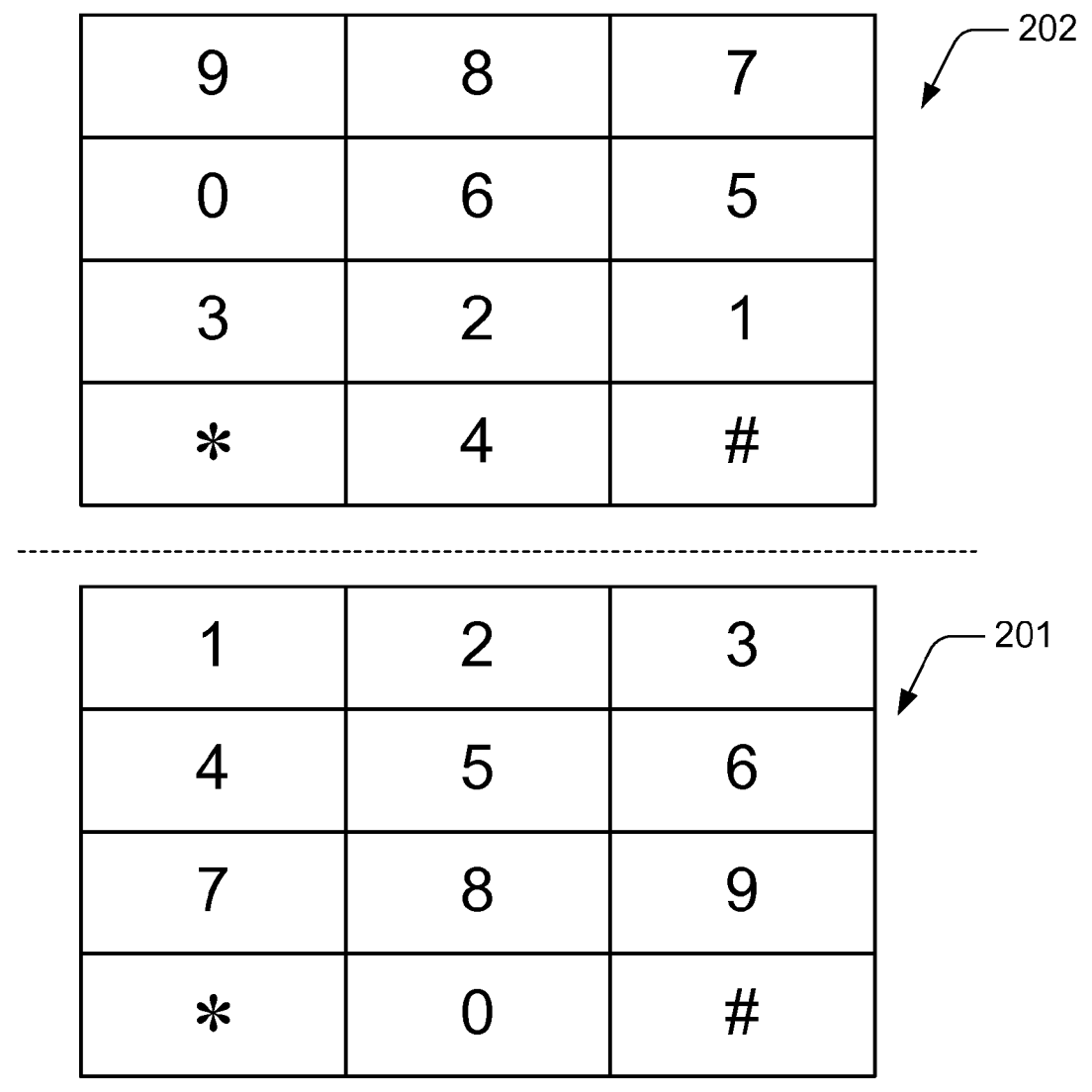

FIG. 2 shows an exemplary actual keyboard layout and a corresponding virtual keyboard layout. Numerical portions of actual keyboard layout 201 of a mobile phone of the user and corresponding virtual keyboard layout 202 randomly generated by the server are arranged for comparison. Suppose the true account password of the user is "123". In the actual keyboard layout 201, the keys for the three digits "1", "2", and "3" are located in the first row of the numerical portion of the actual keyboard layout 201 of the user's mobile phone, arranged from left to right. In the virtual keyboard layout 202 that is generated by the server, the keys for the three digits 1", "2", and "3" are located on the third row of the numerical portion shown, and arranged from right to left. In this example, the key for "9" on the actual keyboard layout 201 corresponds to the key for "1" on the virtual keyboard layout 202, the key for "8" on the actual keyboard layout 201 corresponds to the key for "2" on the virtual keyboard layout 202, while the key for "7" on the actual keyboard layout 201 corresponds to the key for "3" on the virtual keyboard layout 202, and so on. Although the user knows that the true password is "123", the user enters the password in an obscure way by referring to the virtual keyboard layout 202 displayed on the mobile phone. Specifically, the user presses keys "9", "8" and "7" on the actual keyboard of the mobile phone according to the key corresponding relationship displayed by the virtual keyboard 202. As a result, the mobile phone transmits the user entered virtual password "987" to the server through the network. The server then converts the virtual password "987" into the true password "123" based on the corresponding relationship between the virtual keyboard layout 202 and the actual keyboard layout 201. Using this conversion, the server obtains the true account password of the user, and then conducts subsequent operations such as verifying the true account password.

In case where the mobile phone has a touch screen, the virtual input layout 202 may be displayed on the touch screen to serve as a virtual input device which is used as an active input means for the user to enter the security code directly by touching the keys on the virtual input layout 202. For example, the user may press the keys "1", "2" and "3" on the virtual input layout 202 to enter the real security code "123", but the virtual input layout 202 is configured in a such way that the symbols or values of the keys that are transmitted over the network are not be the real security code "123" but a virtual security code "987" resulted from an obscuring translation of the real security code "123" based on the corresponding relationship between the virtual input layout 202 and the actual input layout 112. The virtual security code "987" thus transmitted is then converted back to the real security code "123" by the server 120.

Figure 3:
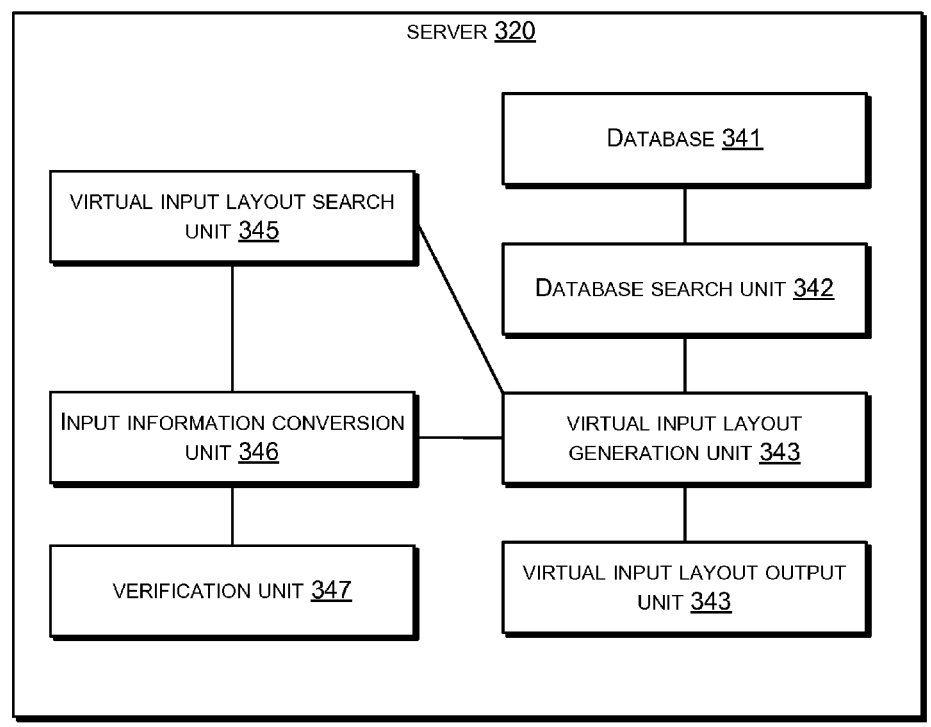
FIG. 3 shows a structural schematic diagram of an exemplary server used for information transmission in accordance with the present disclosure.

FIG. 3 shows a structural diagram of an exemplary server 320 in accordance with the present disclosure. In server 320, a database 341 is used for storing hardware information of most mobile phones on the market, including mobile phone model numbers. The hardware information of the mobile phone includes the keyboard information of the mobile phone. The keyboard information includes symbols represented by the key positions on the mobile phone's keyboard, the keys that are included in the keyboard, and symbols and functions that are entered for the keys when clicked, etc.

A database search unit 342 is used for searching within the database 341 keyboard information of the mobile phone that corresponds to a presently received mobile phone model number.

A virtual input layout generation unit 343 is used for randomly altering the assignments of keys on an actual keyboard layout to generate a virtual keyboard layout based on the keyboard information of the actual keyboard layout obtained by the database search unit 342. The keys that have the same layout positions in the virtual keyboard layout and the actual keyboard layout have a corresponding relationship and may represent different symbols (or functions). At least some of the keys in the virtual input layout represent symbols or functions that are different from the symbols or functions represented by their corresponding keys in the actual input layout. The virtual input layout generation unit 343 is further used for storing the corresponding relationships between the keys in the virtual keyboard layout and the keys in the actual keyboard layout, and assigning a unique identifier for each virtual keyboard.

A virtual input layout output unit 344 is used for sending the virtual keyboard layout that has been generated by the virtual input layout generation unit 343 to the mobile phone to be displayed to the user. The virtual keyboard layout may be displayed on a web page logged in by a user through the mobile phone. The virtual input layout output unit 344 may also output the identifier of the virtual keyboard layout to a form of the web page as a hidden field.

A virtual input layout search unit 345 is used for finding the virtual keyboard layout stored in the virtual input layout generation unit 343 that corresponds to the identifier of the virtual keyboard layout submitted by the user.

An input information conversion unit 346 is used for converting the virtual security code submitted by the user into the true security code which would have been entered had the user used key layout of the actual keyboard. The conversion is done based on corresponding relationships between the keys in the virtual keyboard layout and the keys in the actual keyboard layout according to the virtual keyboard layout identified by the virtual input layout search unit 345.

A verification unit 347 is used for verifying the true security code.

Herein, a "unit" is a device which is a tool or machine designed to perform a particular task or function. A unit or device can be a piece of hardware, software, a plan or scheme, or a combination thereof, for effectuating a purpose associated with the particular task or function. In addition, delineation of separate units does not necessarily suggest that physically separate devices are used. Instead, the delineation may be only functional, and the functions of several units may be performed by a single combined device or component. When used in a computer-based system, regular computer components such as a processor, a storage and memory may be programmed to function as one or more units or devices to perform the various respective functions.

Figure 4:
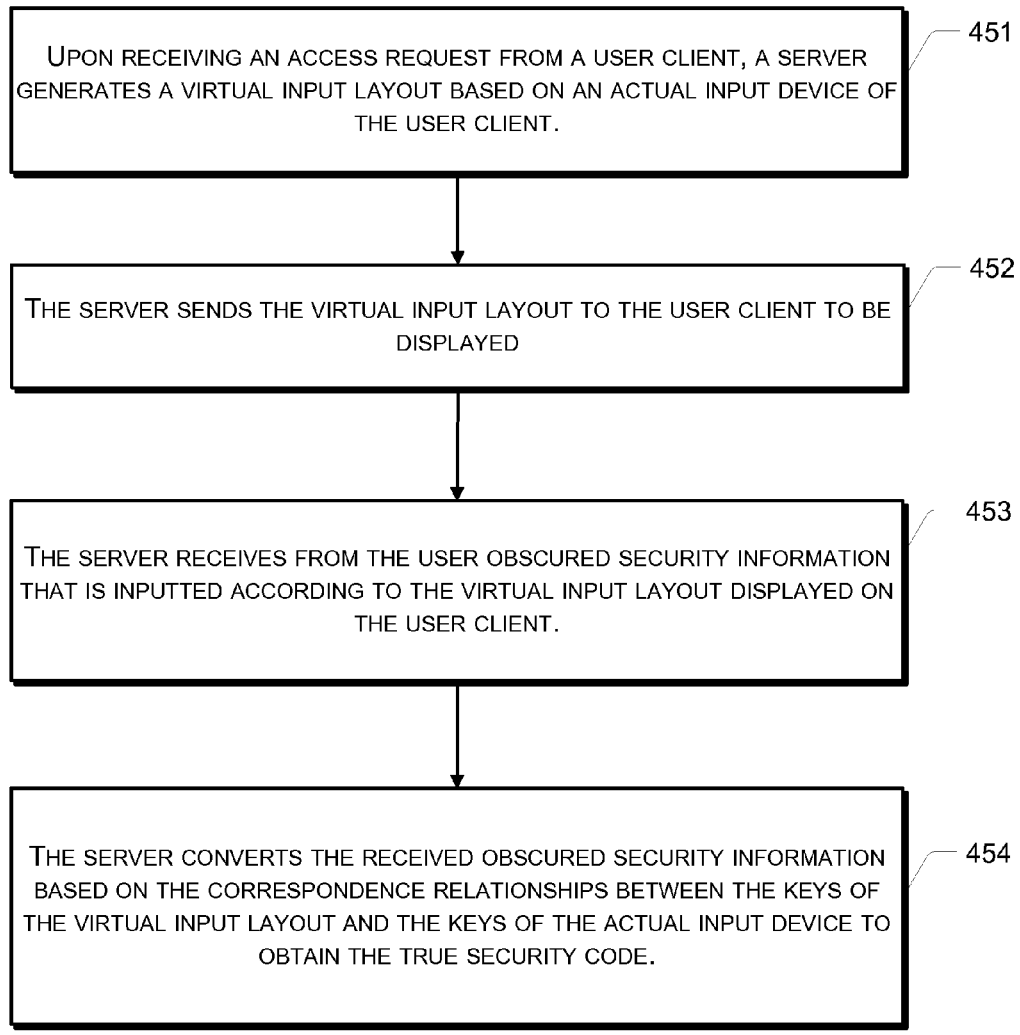
FIG. 4 shows a flow chart of an exemplary process for information transmission in accordance with the present disclosure.

FIG. 4 shows a flow chart of an exemplary process 400 of information transmission in accordance with the present disclosure. In this description, the order in which a process is described is not intended to be construed as a limitation, and any number of the described process blocks may be combined in any order to implement the process 400, or an alternate process. The process 400 is described as follows.

At block 451, upon receiving an access request from a user client, the server (e.g., server 320) generates a virtual input layout based on an actual input layout of the user client. Keys having the same layout positions on the virtual input layout and the actual input layout have a corresponding relationship. Moreover, at least some of the keys in the virtual input layout represent symbols or functions that are different from their corresponding keys in the actual input layout.

At block 452, the server sends the virtual input layout to the user client to be displayed to the user through.

At block 453, the server receives from the user an obscured (virtual) security code that is entered according to the virtual input layout displayed on the user client.

At block 454, the server converts the received obscured security code based on the corresponding relationships between the keys in the virtual input layout and the keys in the actual input layout to obtain the true security code.

It is appreciated that although a security code such as a password is used for the purpose of illustration, any textual information of security importance can be protected in transmission using the disclosed method and the system.

In summary, the method for transmitting information as described in the present disclosure achieves a form of simple "encryption" of security information of a user on a device having limited security capabilities. Virtual (obscured) security information, rather than true security information of the user, is transmitted over the network from a user client to the server. The disclosed method effectively prevents the real security information of the user from being stolen, because what is transmitted over a network is obscured security information which is essentially an encryption of the actual security information. The real security information is not transmitted in a plaintext as what would happen when a user client fails to install security encryption control. Secure transmission of information is therefore achieved. The proposed method is easy to implement, reliable, and occupies very little resource of a user client.

It is appreciated that the potential benefits and advantages discussed herein are not to be construed as a limitation or restriction to the scope of the appended claims.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method for information transmission, the method comprising:

receiving at a server an access request from a user client;

receiving user client information from the user client, the user client information including a model number of the user client;

finding an actual input layout of the user client by using the user client information;

generating a virtual input layout based on information of the actual input layout of the user client, wherein each key in the virtual input layout has a corresponding relationship with a respective key in the actual input layout, and at least some of the keys in the virtual input layout represent symbols or functions that are different from their corresponding keys in the actual input layout;

sending the virtual input layout to the user client to be displayed;

receiving from the user client a virtual security information entered according to the virtual input layout displayed by the user client; and converting the received virtual security information based on the corresponding relationships between the keys in the virtual input layout and the keys in the actual input layout to obtain true security information.

2. The method as recited in claim 1, further comprising: generating an identifier of the virtual input layout.

3. The method as recited in claim 2, further comprising: sending the identifier of the virtual input layout as a hidden field in a form of a web page displayed on the user client.

4. The method as recited in claim 3, further comprising: receiving the identifier of the virtual input layout along with the virtual security information from the user client; and finding the corresponding relationships between the keys in the virtual input layout and the keys in the actual input layout based on the identifier.

5. The method as recited in claim 2, wherein the identifier of the virtual input layout is unique.

6. The method as recited in claim 1, wherein the virtual security information is entered using an actual keyboard of the user client according to the virtual input layout.

7. The method as recited in claim 1, wherein the virtual security information is entered using a virtual input device having the virtual input layout.

8. The method as recited in claim 1, wherein sending the virtual input layout to the user client to be displayed comprises:

sending the virtual input layout to a web page displayed on the user client.

9. The method as recited in claim 1, wherein the true security information comprises a security code.

10. The method as recited in claim 1, wherein the user client is a mobile phone.

11. A method for information transmission, the method comprising:

receiving at a server an access request from a mobile phone;

generating a virtual input layout based on information of an actual input layout of the mobile phone, wherein each key in the virtual input layout has a corresponding relationship with a respective key in the actual input layout, and at least some of the keys in the virtual input layout represent symbols or functions that are different from their corresponding keys in the actual input layout;

sending the virtual input layout to the mobile phone to be displayed;

generating an identifier of the virtual input layout;

sending the identifier of the virtual input layout to the mobile phone;

receiving from the mobile phone a virtual security code entered according to the virtual input layout displayed by the mobile phone;

receiving from the user client the identifier of the virtual input layout;

finding the corresponding relationships between the keys in the virtual input layout and the keys in the actual input layout based on the identifier of the virtual input layout; and converting the received virtual security code based on the corresponding relationships between the keys in the virtual input layout and the keys in the actual input layout to obtain a true security code.

12. The method as recited in claim 11, further comprising: receiving user client information from the mobile phone; and finding the actual input layout of the mobile phone using the user client information.

13. The method as recited in claim 12, wherein the user client information comprises a model number of the user client.

14. The method as recited in claim 11, further comprising sending the identifier of the virtual input layout as a hidden field in a form of a web page displayed on the mobile phone.

15. The method as recited in claim 11, wherein the identifier of the virtual input layout is unique.

16. The method as recited in claim 11, wherein the information of the actual input layout of the mobile phone comprises a model number of the mobile phone.

17. A server, comprising:
a database configured to store information of actual input layouts of various user clients based on their respective user client information, a respective user client information including a respective model number of a respective user client, information of a respective actual input layout of a respective user client including symbols, and functions represented by the keys in the respective actual input layout of the respective user client;

a database search unit configured to search within the database information for an actual input layout that corresponds to a model number of a user client, and send the found information of the actual input layout to a virtual input layout generation unit;

the virtual input layout generation unit configured to generate a virtual input layout based on information of the actual input layout of the user client, each key in the virtual input layout having a corresponding relationship with a respective key in the actual input layout, at least some of the keys in the virtual input layout representing symbols or functions that are different from their corresponding keys in the actual input layout;

a virtual input layout output unit configured to send the virtual input layout to the user client to be displayed; and an input information conversion unit configured to receive obscured security information entered through the user client according to the virtual input layout displayed on the user client, and to convert the received obscured security information based on the corresponding relationships between the keys in the virtual input layout and the keys in the actual input layout to obtain true security information.

18. The server as recited in claim 17, further comprising:
a virtual input layout search unit configured to find the virtual input layout that corresponds to an identifier of the virtual input layout submitted by the user client, wherein the identifier of the virtual input layout is generated by the virtual input layout generation unit and sent to the user client, and the input information conversion unit is further used for finding the corresponding relationships between the keys on the virtual input layout and the keys in the actual input layout according to the virtual input layout found by the virtual input layout search unit.

19. The server as recited in claim 18, wherein the identifier of the virtual input layout is unique.

20. The server as recited in claim 17, wherein the user client is a mobile phone.

* * * * *

UNITED STATES PATENT AND TRADEMARK OFFICE
CERTIFICATE OF CORRECTION

PATENT NO. : 8,484,480 B2  
APPLICATION NO. : 12/663247  
DATED : July 9, 2013  
INVENTOR(S) : Li Cheng et al.

Page 1 of 1

It is certified that error appears in the above-identified patent and that said Letters Patent is hereby corrected as shown below:

On the Title Page, item (73), change "Alibaby" to "Alibaba"

Signed and Sealed this  
Twenty-fourth Day of September, 2013

Teresa Stanek Rea  
*Deputy Director of the United States Patent and Trademark Office*